(12) United States Patent
Sasaki

(10) Patent No.: US 7,343,105 B2
(45) Date of Patent: Mar. 11, 2008

(54) IMAGE FORMING APPARATUS AND CONTROL METHOD OF IMAGE FORMING APPARATUS WITH OPERATION BASED UPON DOWN EVENT OCCURRENCES

(75) Inventor: Katsuhiko Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 11/167,399

(22) Filed: Jun. 28, 2005

(65) Prior Publication Data

US 2006/0002721 A1     Jan. 5, 2006

(30) Foreign Application Priority Data

Jun. 30, 2004   (JP) ............................. 2004-194579
Jun. 15, 2005   (JP) ............................. 2005-175516

(51) Int. Cl.
   *G03G 15/00*   (2006.01)
(52) U.S. Cl. .............................................. 399/8; 399/9
(58) Field of Classification Search .................... 399/8, 399/9
   See application file for complete search history.

(56) References Cited

U.S. PATENT DOCUMENTS

| | | | |
|---|---|---|---|
| 5,467,449 A | | 11/1995 | Gauronski et al. |
| 5,680,541 A | | 10/1997 | Kurosu et al. |
| 5,790,916 A | * | 8/1998 | Sawada .......................... 399/8 |
| 6,108,492 A | * | 8/2000 | Miyachi ......................... 399/8 |
| 6,112,035 A | * | 8/2000 | Kuroyanagi et al. ........... 399/9 |
| 6,310,692 B1 | | 10/2001 | Fan et al. |
| 2003/0142985 A1 | | 7/2003 | Sampath et al. |

FOREIGN PATENT DOCUMENTS

| | | |
|---|---|---|
| JP | 9-272372 | 10/1997 |
| JP | 10-137243 | 5/1998 |
| JP | 10-333999 | 12/1998 |
| JP | 2001-344087 | 12/2001 |
| JP | 2003/58644 | 2/2003 |
| JP | 2005-100304 | 4/2005 |

OTHER PUBLICATIONS

European Search Report.

* cited by examiner

*Primary Examiner*—William J. Royer
(74) *Attorney, Agent, or Firm*—Oblon, Spivak, McClelland, Maier & Neustadt, P.C.

(57) ABSTRACT

In an image forming apparatus including an image reading part reading an original image; and a printing part printing the read image, it is detected that a down frequency or a number of times when the image forming apparatus enters a down state exceeds a threshold; and when the down frequency exceeds the threshold, this event is reported externally.

12 Claims, 13 Drawing Sheets

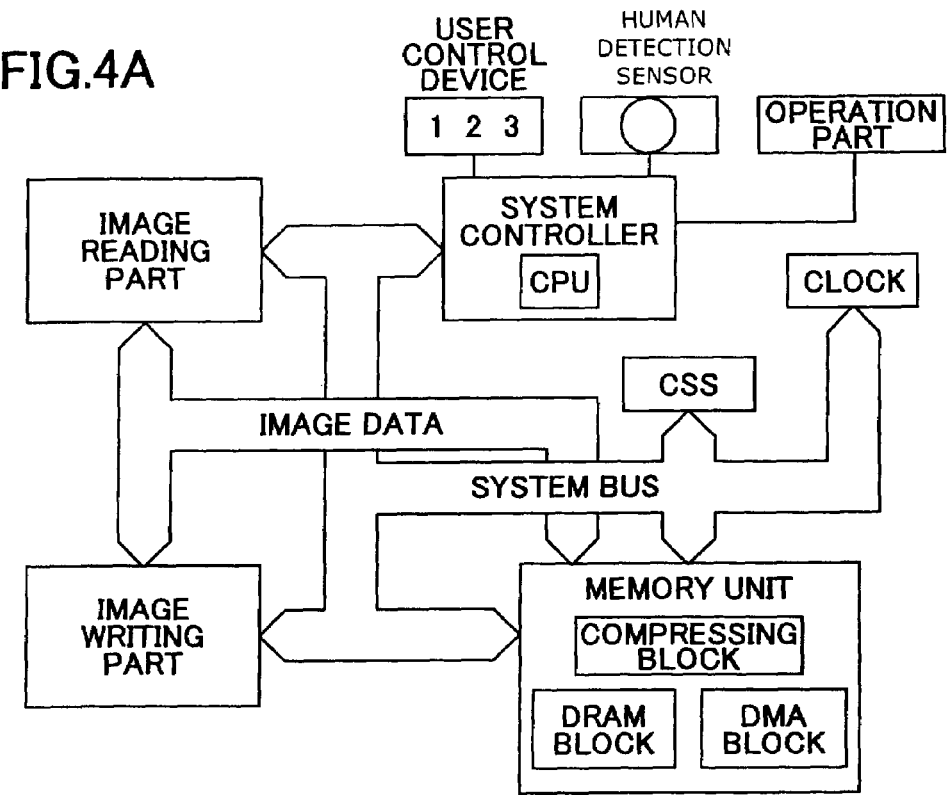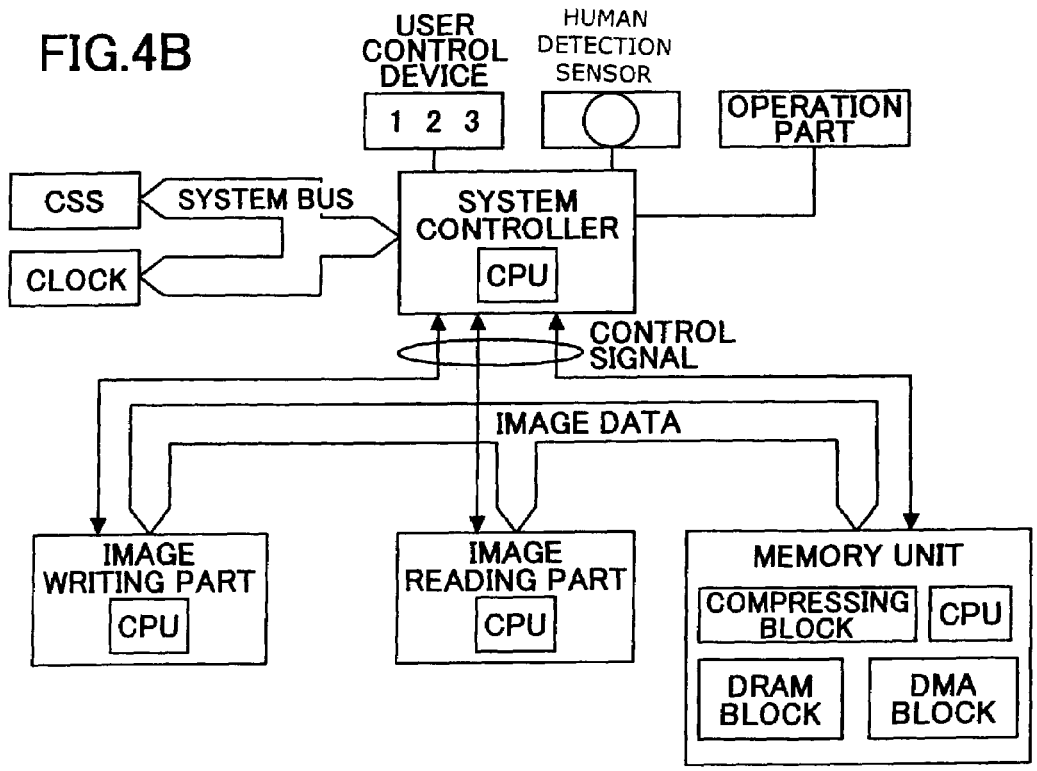

FIG.12

| | DATA NAME | VALUE RANGE | DETAILS | SIZE |
|---|---|---|---|---|
| (1) | DOWN TIME DETECTION PERIOD | 0: NOT DETECT<br>1: ONE DAY<br>2: ONE WEEK<br>3: ONE MONTH | SET PERIOD OF DOWN TIME DETECTION | 1Byte |
| (2) | DOWN TIME DETECTION START SETTING | 0~23 (ONE DAY SETTING: TIME)<br>1~7 (ONE WEEK SETTING: DAY OF WEEK)<br>1~31<br>(ONE MONTH SETTING: DAY OF MONTH) | SET DETECTION START TIME/DAY OF WEEK/DAY OF MONTH FOR EACH PRIOD SETTING | 1Byte |
| (3) | DOWN TIME TOTAL | 0 THROUGH 99999 (TIMES) | RECORD TOTAL NUMBER OF DOWN TIMES | 4Bytes |
| (4) | DOWN TIME FROM ORIGINAL JAM | 0 THROUGH 99999 (TIMES) | RECORD NUMBER OF DOWN TIMES FROM ORIGINAL JAM | 4Bytes |
| (5) | DOWN TIME FROM TRANSFER PAPER JAM | 0 THROUGH 99999 (TIMES) | RECORD NUMBER OF DOWN TIMES FROM TRANSFER PAPER JAM | 4Bytes |
| (6) | DOWN TIME FROM ORIGINAL TONER END | 0 THROUGH 99999 (TIMES) | RECORD NUMBER OF DOWN TIMES FROM TONER END | 4Bytes |
| (7) | DOWN TIME FROM FAILURE | 0 THROUGH 99999 (TIMES) | RECORD NUMBER OF DOWN TIMES FROM FAILURE | 4Bytes |
| (8) | LAST DATE/TIME OF DOWN DETECTION | TOTAL TIME MEASURED FROM JANUARY 1, 1970, 00:00:00 | DATE/TIME OF LAST DETECTION OF DOWN EVENT | 4Bytes |
| (9) | DOWN REPORT THRESHOLD 1 | 0 THROUGH 99999 (TIMES) | 0: NOT REPORT<br>FROM 1: TO REPORT | 4Bytes |
| (10) | DOWN REPORT THRESHOLD 2 | 0 THROUGH 99999 (TIMES) | 0: NOT REPORT<br>FROM 1: TO REPORT | 4Bytes |
| (11) | DOWN REPORT THRESHOLD 3 | 0 THROUGH 99999 (TIMES) | 0: NOT REPORT<br>FROM 1: TO REPORT | 4Bytes |
| (12) | DOWN REPORT THRESHOLD 4 | 0 THROUGH 99999 (TIMES) | 0: NOT REPORT<br>FROM 1: TO REPORT | 4Bytes |
| (13) | DOWN DETECTION FLAG: ORIGINAL JAM | 0 , 1 | 0: NOT TO TREAT AS DETECTION TARGET<br>1: TO TREAT AS DETECTION TARGET | 1bit |
| (14) | DOWN DETECTION FLAG: TRANSFER PAPER JAM | 0 , 1 | 0: NOT TO TREAT AS DETECTION TARGET<br>1: TO TREAT AS DETECTION TARGET | 1bit |
| (15) | DOWN DETECTION FLAG: TONER END | 0 , 1 | 0: NOT TO TREAT AS DETECTION TARGET<br>1: TO TREAT AS DETECTION TARGET | 1bit |
| (16) | DOWN DETECTION FLAG: FAILURE | 0 , 1 | 0: NOT TO TREAT AS DETECTION TARGET<br>1: TO TREAT AS DETECTION TARGET | 1bit |

# IMAGE FORMING APPARATUS AND CONTROL METHOD OF IMAGE FORMING APPARATUS WITH OPERATION BASED UPON DOWN EVENT OCCURRENCES

BACKGROUND OF THE INVENTION

1. Field of the Invention

The present invention relates to an image forming apparatus and a control method of an image forming apparatus, and in particular, to processing concerning down event occurrence in an image forming apparatus.

2. Description of the Related Art

In an image forming apparatus in the related art, a communication part is provided having a function to inform a service center of occurrence of a machine failure or such. With the use of the communication part, a function to notify of a fact that a paper jam has frequently occurred, a function to notify of a fact that supply end has occurred, and so forth are provided. Further, recently, there may be a case in which a contract is set between a vendor and a user such that a down time of an image forming apparatus should be prevented from exceeding a predetermined time during a predetermined period (for example, a week).

Further, in the related art, various arts have been proposed concerning maintenance service of an apparatus or a system, as follows:

(1) A network system configured in such a manner that a user can cope with various troubles of an apparatus such as a printer, while a maintenance service side can make an efficient apparatus management (see Japanese Laid-open Patent Application No. 2001-344087):

(2) A support system configured in such a manner that, as a result of a service concerning a proposal to build and a management of an IT environment being provided via a single service window for a user in the lump, user friendliness is provided and a satisfaction is given to the user (see Japanese Laid-open Patent Application No. 2003-58644);

(3) A bus control technology configured in such a manner that an I/O bus bridge on an I/O bus and a reduction in a down time are achievable (see Japanese Laid-open Patent Application No. 10-333999);

(4) A trouble diagnosis method for a dump truck configured in such a manner that a trouble occurrence may be prevented, and also, a diagnosis may be achieved such that a true trouble cause may be found out rapidly (see Japanese Laid-open Patent Application No. 9-272372); and (5) An ultrasonic wave diagnosis apparatus configured in such a manner that data of respective ultrasonic wave diagnosis apparatuses located in distant places may communicate their data mutually via radio communication systems of these apparatuses (see Japanese Laid-open Patent Application No. 10-137243).

SUMMARY OF THE INVENTION

The present invention is directed to notifying a vendor of a down frequency for each user for when an image forming apparatus actually enters an out-of-service state (simply referred to as a down state, hereinafter) by some cause for a case where the user and the vendor have concluded the above-mentioned contract that a down time of the image forming apparatus is prevented from exceeding a predetermined time during a predetermined period, for example.

According to a first aspect of the present invention, an image forming apparatus includes: an image reading part reading an original image; a printing part printing the read image; a detecting part detecting that a down frequency or a number of times when the image forming apparatus enters a down state exceeds a threshold; and a communication part reporting externally when the down frequency exceeds the threshold.

According to a second aspect of the present invention, in the first aspect of the present invention, the threshold may be changeable from the outside via at least any one of the communication part and an operation part provided in the image forming apparatus.

According to a third aspect of the present invention, in the first or second aspect of the present invention, the detecting part may detect the down frequency for each cause of down events; and the communication part may report for each cause of down events.

According to a fourth aspect of the present invention, the third aspect of the present invention may further include a cause setting part with which the cause of the down events is set.

According to a fifth aspect of the present invention, in the third or fourth aspect of the present invention, the threshold may be changeable for each of the causes of down events externally via at least any one of the communication part and an operation part provided in the image forming apparatus.

According to a sixth aspect of the present invention, in any one of the third through fifth aspects of the present invention, the cause of down events may include at least one of original jam, transfer paper jam and supply end.

According to a seventh aspect of the present invention, a control method of an image forming apparatus which includes an image reading part reading an original image; and a printing part printing the read image, includes the steps of: a detecting step of detecting that a down frequency or a number of times when the image forming apparatus enters a down state exceeds a threshold; and a communication step of reporting externally when the down frequency exceeds the threshold.

According to an eighth aspect of the present invention, in the seventh aspect of the present invention, the threshold may be changeable from the outside via at least any one of a communication part and an operation part provided in the image forming apparatus.

According to a ninth aspect of the present invention, in the seventh or eighth aspect of the present invention: in the detecting step, the down frequency may be detected for each cause of down events; and, in the communication step, reporting may be carried out for each cause of down events.

According to a tenth aspect of the present invention, the ninth aspect of the present invention may further include a cause setting step of setting the cause of down events.

According to an eleventh aspect of the present invention, in the ninth or tenth aspect of the present invention, the threshold may be changeable for each of the causes of down events externally via at least any one of a communication part and an operation part provided in the image forming apparatus.

According to a twelfth aspect of the present invention, in any one of the third through eleventh aspects of the present invention, the cause of down events may include at least one of original jam, transfer paper jam and supply end.

In the first or seventh aspect of the present invention, a fact that the number of down times during a predetermined period exceeds the threshold is notified of to a vendor each time, and thus, the vendor can take an appropriate measure before a penalty actually occurs due to a fact that a predetermined down frequency limit according to the above-mentioned contract is exceeded, which fact may otherwise occur.

In the second, fifth, eighth or eleventh aspect of the present invention, the threshold for the down frequency for each user is changeable externally, and thus, the down frequency notification function can be flexibly operated according to the contract of each particular user.

In the third, sixth, ninth or tenth aspect of the present invention, the down frequency information can be detected for each specific cause of down events, and thus, a main cause of frequently occurring down events can be determined.

In the fourth, sixth, tenth or twelfth aspect of the present invention, the down causes can be respectively set, and thus, flexible operation in response to various types of contracts can be provided.

BRIEF DESCRIPTION OF THE DRAWINGS

Other objects and further features of the present invention will become more apparent from the following detailed description when read in conjunction with the accompanying drawings:

FIGS. 4A and 4B show block diagrams of hardware configuration examples of the image forming apparatus;

FIG. 12 shows a data configuration concerning a down frequency measurement function stored in a non-volatile memory.

DESCRIPTION OF THE PREFERRED EMBODIMENT

Figure 1:
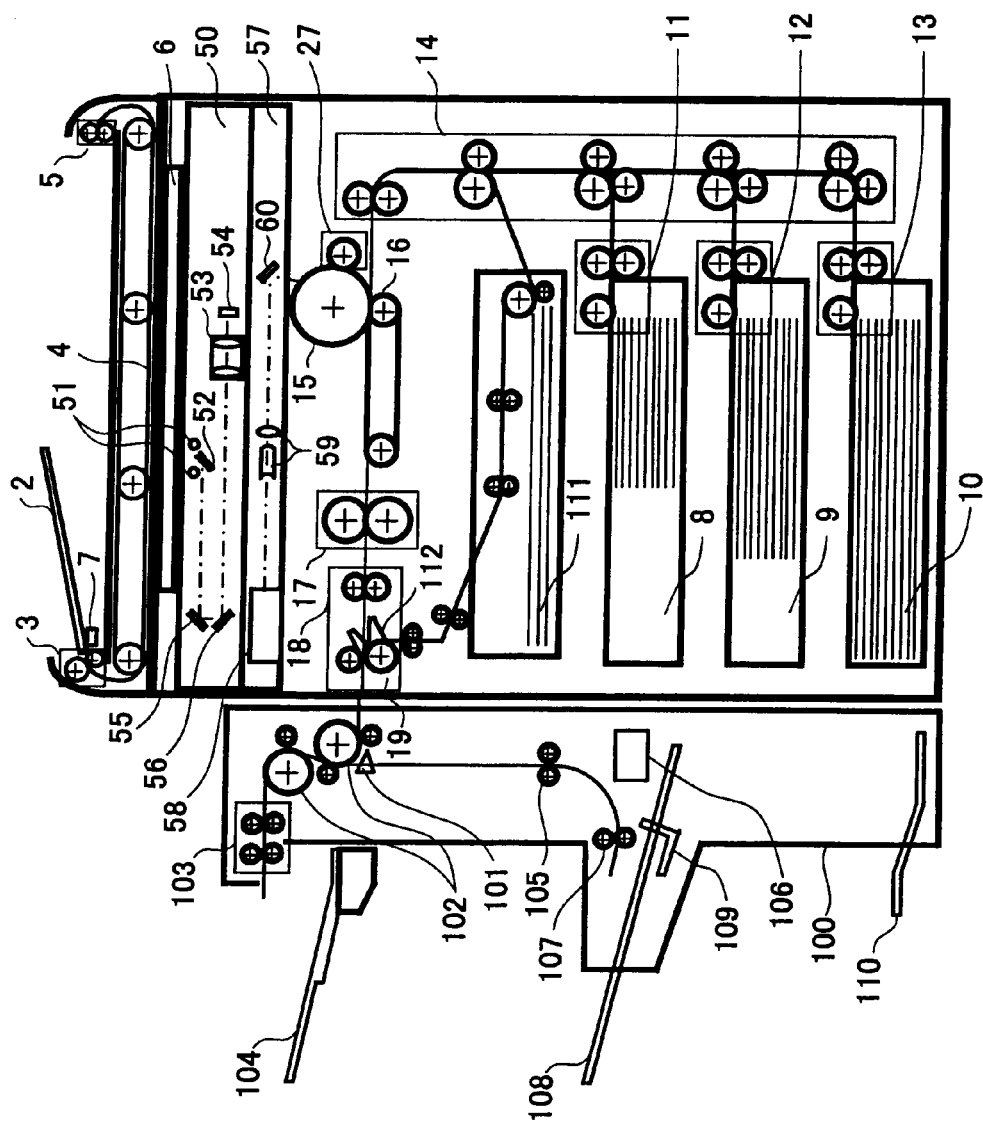
FIG. 1 shows a configuration of an image forming apparatus in one embodiment of the present invention.

Below, an embodiment of the present invention is described with reference to figures.

When a contract is concluded between a user and a vendor such that a down time of an image forming apparatus is prevented from exceeding a predetermined value during a predetermined period, a down time may be totalized for the predetermined period, and a notification may be made when the thus-totalized down time exceeds a threshold, so that an increase in the down time may be prevented. Other than this way of totalizing the down time, a contract may be concluded with a user such that a threshold is fixed for a down frequency or a number of times when down events occur for a predetermined period, so that the down frequency is prevented from exceeding a predetermined value.

Assuming a case of an event when the image forming apparatus enters a down state (simply referred to as a down event, hereinafter) caused by a jam of transfer paper or a jam of an original is assumed, if a considerable time has elapsed until a user completes a recovery from this down event by removing the jamming transfer paper or the jamming original from the machine, the total down time may easily exceed the contract limit. For this reason, the contract based on the down frequency is advantageous for the vendor accommodating un-skilled users. On the other hand, for a user who is skilled in operation to removing jamming paper from the machine, a contract based on the down frequency may be advantageous rather than a contract based on the total down time.

Further, in terms of machine preventive maintenance, it is expected that accurate maintenance is achievable with checking of the cause-by-cause down frequency rather than simply checking the total down time. For example, as to a machine trouble detection for example, which part of the machine has a trouble or may have a trouble may be positively understandable from a trouble occurrence frequency rather than from a trouble continuance time.

Therefore, a first object of the embodiment of the present invention is to provide a system to achieve machine preventive maintenance enabling such a configuration that a plurality of thresholds for down frequency is previously set for the machine, and, when the down frequency in the machine exceeds each threshold, this matter is immediately notified of to the vendor.

Further, in the image forming apparatus, a contract for the down frequency threshold may be different for each particular user. Therefore, it is preferable that the down frequency notification threshold should be easily changeable. A second object of the present embodiment is to make possible to provide operation according to contract terms of each user in which the down frequency notification threshold for a user can be changed via an operation panel and/or a communication part externally.

Further, in the image forming apparatus, a measure to be taken by the vendor may be different depending on a particular cause of a down event. For example, when a down event occurs due to a supply end, the measure to be taken by the vendor is to order a supply such as a toner bottle or such. When a down event occurs due to a machine trouble, a CE (customer engineer) should be dispatched to the site. A third object of the present invention is to make it possible to determine a main cause of down events by preparing a plurality of cause-by-cause down frequency items to obtain.

Further, in the image forming apparatus, a user may determine that a specific down cause should not be included in causes of down events to be measured. For example, such an operation that down events due to supply end may be excluded from counting, but only machine trouble should be counted, or such, may be carried out. A fourth object of the present invention is to make possible respective operations according to various types of contracts, by making it possible to set respective cause items of down events to count.

First, terms applied in the description of the present embodiment are defined now.

[Image Reading Part]

An 'image reading part' applied in a digital PPC (plain paper copier, or a digital copier by which copying can be carried out on ordinary paper) has a function of applying light from a light source on an original; converting reflected light therefrom into an electric signal by means of a 'solid state image sensing device or a CCD'; and carrying out 'required processing' on the thus-obtained signal. This required processing is listed below:

Quantization: Analog data thus obtained from the reflected light via the CCD is transformed into binary data or multi-tone data;

Shading correction: The light source's light emission characteristic variation and/or the CCD's sensitivity variation is corrected;

MTF correction: Blur occurring from an optical system is corrected; and

Size change processing: Image reading density is controlled, or data interpolation is carried out with the use of the read data.

[Image Writing Part]

An 'image writing part' applied in the digital PPC forms an image provided in a form of an electric signal by means of electrophotographic printing, thermal printing, and carries out thermal transfer printing, ink jet printing or such, on an ordinary paper, a heat sensitive paper or such.

[Image Data]

The image electric signal obtained from the 'image reading part', the image electric signal input to the 'image writing part' and a signal applied for synchronization with the image electric signal are generally referred to as 'image signals'.

[Control Signal] or [Command]

Information, other than the image signal, should be mutually transferred among respective devices for exchanging the 'image signal' among the 'image reading part', the 'image writing part' and 'applications'. Signals applied therefor are referred to as 'control signals' or 'commands'.

[Extended Function], [Application], [Memory Function] or [Memory Unit]

Features of the digital PPC are described below: In the digital PPC, an image is converted into an electric signal, and, from the electric signal, the original image is recovered by means of the image writing part. A device to transform the electric signal obtained from reading the image in various ways or transmit the same is provided, and thereby, the apparatus may be applied to a field other than that of a conventional analog PPC.

That is, recently, other than functions of a facsimile machine, a page printer, a scanner, a file system and so forth, a so-called memory function or such may be achieved. The memory function is a function by which, even during an execution of the PPC function as a result of the read image data being once stored in a storage device such as a DRAM or such, and then, the image data being read out therefrom as is necessary, printing out of a plurality of copies can be executed from a single scanning operation, or printing out for a single transfer paper from a plurality of originals can also be carried out.

Such a function, which can be achieved only by the digital PPC, is referred to as 'extended function' achievable by an 'application'. The memory unit in the present embodiment is also applied as a buffering device in a transfer of image data among apparatuses connected to a common communication network.

[System Controller]

A controller controlling paper conveyance processing, electrophotographic processing, intra-machine monitoring for a trouble situation, paper feeding cassette condition (existence/absence of paper) monitoring for image forming processing, scanning operation or tuning on/off of the light source for reading an image (original) in the image reading part, and so fourth, is generally referred to as a 'system controller'. Further, in the recent digital PPC, a plurality of applications may be mounted in a single machine for respective extended functions. Such a digital PPC sharing a single resource is referred to as a 'system', and a controller controlling the system may also be referred to as a 'system controller'.

[Resource]

A functional unit shared by a plurality of applications is referred to as a 'resource'. The above-mentioned 'system controller' carries out system control for each recourse unit. Resources managed by the digital PPC in the present embodiment include the 'image reading part', the 'image writing part', the 'operation part', the 'memory unit', 'peripheral devices (ADF, sorter, automatic both-side unit and so forth)', and so forth.

[User Limiting]

In particular, the PPC applying an electrophotographic process takes much consumption, and thus, usage thereof may not have to be allowed without a limitation. Therefore, a 'user limiting device' such as a 'coin rack', a 'key counter', a 'key card'. a 'prepaid card' or such, or a 'password' may be applied to specify, limit or manage 'users'.

[User Setting]

When a system is complicated, separately responding (or customizing) is required for each user. Since it is not possible to completely achieve this before the shipment, this should be achieved in a commercial scene. Therefore, commonly, a non-volatile RAM is provided, and therewith, system setting is allowed. This function is referred to as 'user setting'.

[Idle State]

A state of the machine automatically occurring after a state in which no operation is carried out by the user continues for a predetermined interval is referred to as an 'idle state'. The state other than this idle state is referred as a 'busy state'. The predetermined interval required for the transition from the busy state to the idle state can be set by the user. For example, the idle state is not entered during copying operation, and also, is not entered unless a user's non-operation state continues for a predetermined duration after the copying operation is finished.

[Weekly Timer]

A function with which, according to a previously set ON/OFF time, a power source of the machine is turned on/off automatically for each specific day of the week is referred to as a 'weekly timer'. For this purpose, time correction operation for a clock module, and operation to set ON/OFF time for each specific day of the week are required.

[Reheating]

A mode in which a fixing temperature is controlled in a reduced temperature condition (for example, reduced by 10° C.), a display of the operation part is tuned off, and thus, power consumption is reduced (power saving), is referred to as a 'preheating' mode. Setting of this mode is carried out from key input via the operation part (operation panel), or, depending on machine setting, this mode may be automatically entered after a predetermined interval has elapsed after the user's last operation. This mode is exited by key input from the operation part, or, depending on machine setting, a human detecting sensor may be applied, and, when a human being standing in front of the machine is detected by the sensor, this mode may be cancelled.

[Reload]

A state in which the fixing device in the machine reaches a predetermined temperature at which fixing can be properly carried out is referred to as a 'reload' state.

[Interrupting Mode]

A mode in which a copy operation is carried out temporarily in an interrupting manner during an execution of another copying operation is referred to as an 'interrupting mode'. After setting this mode, information of a copy mode before the interruption, or midway information is stored in the non-volatile RAM, and then, the mode is initialized so that the interruption mode is entered. After the interrupting copy operation is then completed and the interrupting mode is cancelled, the mode or information stored in the non-volatile RAM are read out and the original state before the setting of the interrupting mode is restored. Thereby, the mode before the interruption can then be continued. Setting/canceling of this mode can be made from key operation on the operation part.

[CSS] (or [Remote Diagnosis System] or [Image Forming Apparatus Management System])

Figure 11:
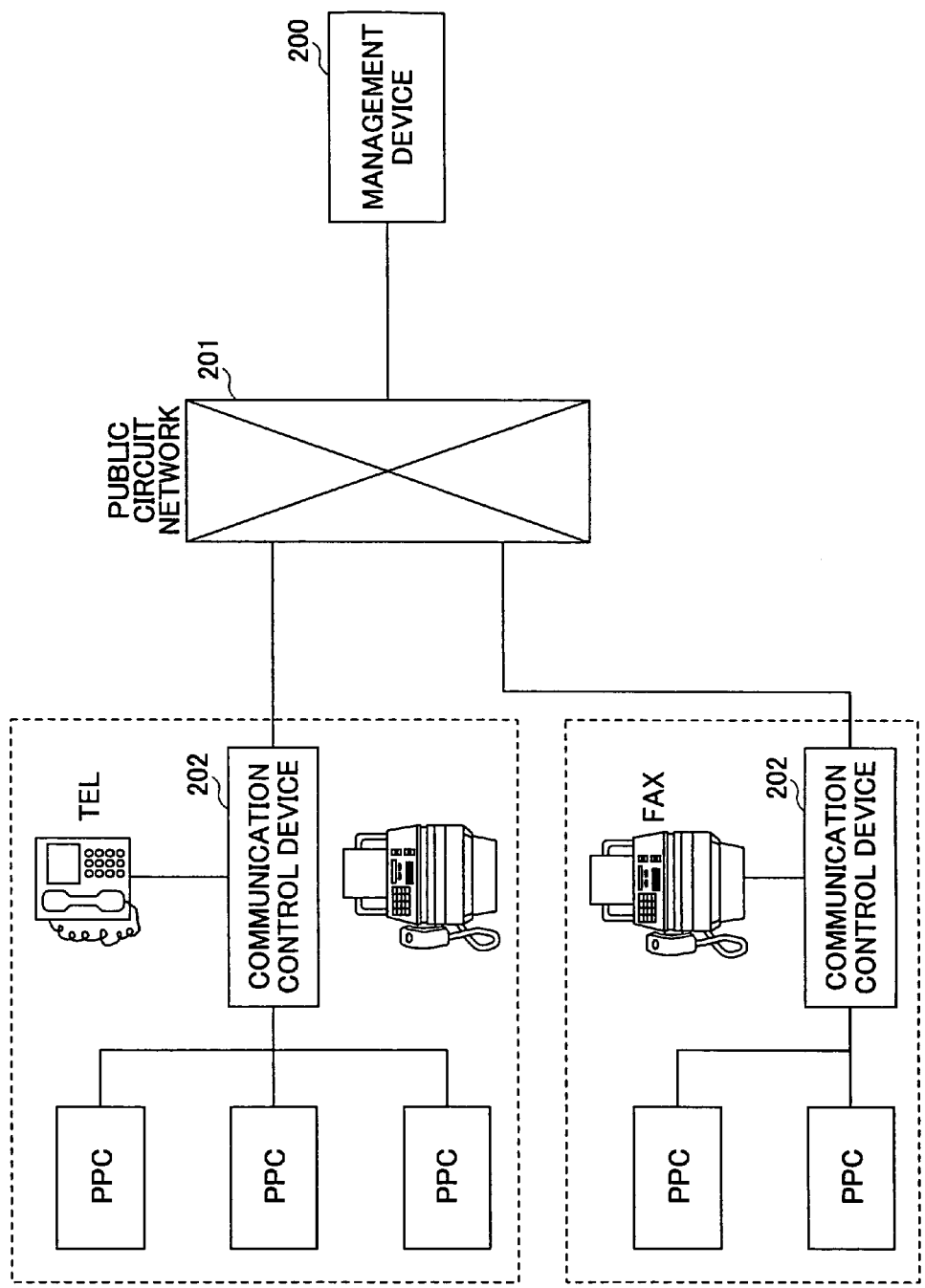
FIG. 11 shows a block diagram of an image forming apparatus management system.

FIG. 11 shows a configuration of an image forming apparatus management system. A management device 200 located in a service center and a plurality of apparatuses such as PPCs or such located on the user's side are connected via a public circuit network 210. On the user's side, a communication control device 202 is set for controlling communication with the management device 200, and the PPCs on the user's side are connected to the communication control device 202. To the communication control device 202, a telephone or a facsimile machine can be connected, and setting can be made in such a manner that the communication control device 202 may be connected to an existing circuit of the user side by insertion thereto. A plurality of PPCs can be connected to the communication control device 202. However, only a single PPC may be connected thereto. These PPCs should not necessarily be in the same type, may be those in different types, and may be apparatuses other than PPCs. For the purpose of simplification of the description, it is assumed that a maximum five PPCs are allowed to be connected to one communication control device 202.

The communication control device 202 and the maximum five PPC are connected in a multi-drop manner according to the RS-485 standard. Communication control between the communication control device 202 and each PPC is carried out according to a basic type data transmission control procedure. A data link is established in a polling/selecting system of a centralized control in which the communication control device 202 acts as a control station, and thereby, the communication control device 202 can carry out communication with any PPC. For each PPC, a unique value can be set by means of an address setting switch, and therewith, a polling address, or a selecting address of each PPC is determined.

Next, the image forming apparatus according to the embodiment of the present invention is described.

FIG. 1 shows the image forming apparatus according to the embodiment of the present invention.

In FIG. 1, a bundle of originals placed on an original table 2 of an automatic draft feeder (referred to as ADF) in such a manner that an original image side faces the bottom, are fed to a predetermined position of a contact glass 6 by means of a feeding roller 3 and a feeding belt 4 from the bottom one of the originals. After the original image data is read via the contact glass 6 by a reading unit 50, the original from which reading has been finished is ejected by means of the feeding belt 4 and an ejecting roller 5. Further, when an original set sensor 7 detects that a next original still exists on the original table 2, it is fed to the contact glass 6 the same as the previous one. The feeding roller 3, feeding belt 4 and ejecting roller 5 are driven by a motor.

Transfer paper stacked on a first tray 8, a second tray 9 or a third tray 10 is fed by a first feeding device 11, a second feeding device 12 or a third feeding device 13, and is conveyed to a position at which it contacts a photosensitive body 15 by a vertically conveying unit 14. Image data read in via the reading unit 50 is written on the photosensitive body 15 by a laser of a writing unit 57, and a toner image is produced as a result of a thus-produced latent image on the photosensitive body 15 passing through a developing unit 27. The transfer paper is conveyed by a conveying belt 16 at a speed the same as the rotation of the photosensitive body 15, while the toner image on the photosensitive body 15 is transferred thereto. After that, a fixing unit 17 fixes the image, and an ejecting unit 18 ejects the image-transferred paper to a finisher 100 of a post processing device by an ejecting unit 18.

The finisher 100 of the post processing unit can introduce the transfer paper conveyed by the ejecting roller 19 of the apparatus body either to an ordinary paper ejecting roller 102 or in a staple paper ejecting direction. By moving a switching plate 101 to the top, the transfer paper is made to be ejected to the side of an ordinary paper ejecting tray 104 via a conveyance roller and an ordinary paper ejecting roller as can be seen at the portion labeled 103. By moving the switching plate 101 to the bottom, the transfer paper is made to be conveyed to a staple table 108 via conveyance rollers 105 and 107. The transfer paper conveyed to the staple table 108 is processed in such a manner that, each time a sheet is thus conveyed thereto, a paper aligning jogger 109 aligns a paper end surface, and a bundle of the transfer paper is bound by a stapler 106 upon the completion of a set of copies. The thus-bound bundle of copies is then held by a staple completion paper ejecting tray 110 by the own weight. The ordinary paper ejecting tray 104 is a paper ejecting tray movable forward and backward. This paper ejecting tray 104 moves forward and backward for each original or each set of copies produced by means of an image memory, and thus, ejected copy paper is simply sorted.

When images are produced on both sides of transfer paper, the transfer paper once having an image produced thereon on one side and fed via the respective paper feeding trays 8 through 10 is not introduced to the ejecting tray 104, but is once stocked in a both side feeding unit 111 as a result of a branching nail 112 for path switching being set to the upper side. After that, the transfer paper once stocked in the both side feeding unit 111 is again fed therefrom so as to have an image, produced on the photosensitive body 15, transferred thereto on the reverse side, and the branching nail 112 for path switching is set to the lower side so that the transfer paper is introduced to the ejecting tray 107. The both side feeding unit 111 is used in this way for when images are produced on both side of transfer paper. The photosensitive body 15, the conveyance belt 16, the fixing unit 17, the paper ejecting unit 18 and the developing unit 27 are driven by a main motor, and respective feeding units 11 through 13 are driven by the main motor via respective clutches. The paper conveyance unit 14 is driven by the main motor via an intermediate clutch.

Figure 2:
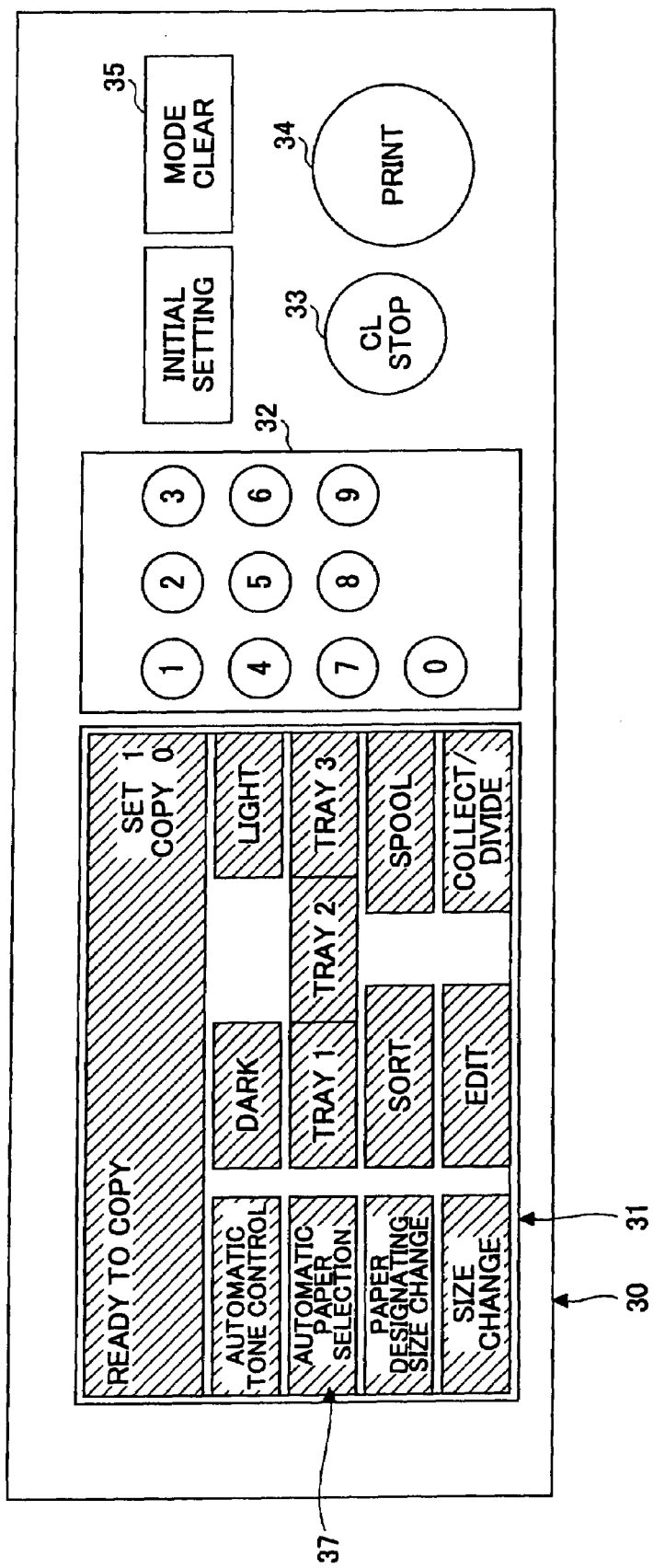
FIG. 2 shows a configuration of an operation part of the image forming apparatus.

FIG. 2 shows the operation part or the operation panel 30.

The operation panel 30 has a liquid crystal panel 31, a ten-key pad 32, a clear/stop key 33, a print key 34 and a mode clear key 35. On the liquid crystal panel 31, function keys 37, as well as messages indicating the number of copies or a state of the image forming apparatus are displayed.

Figure 3:
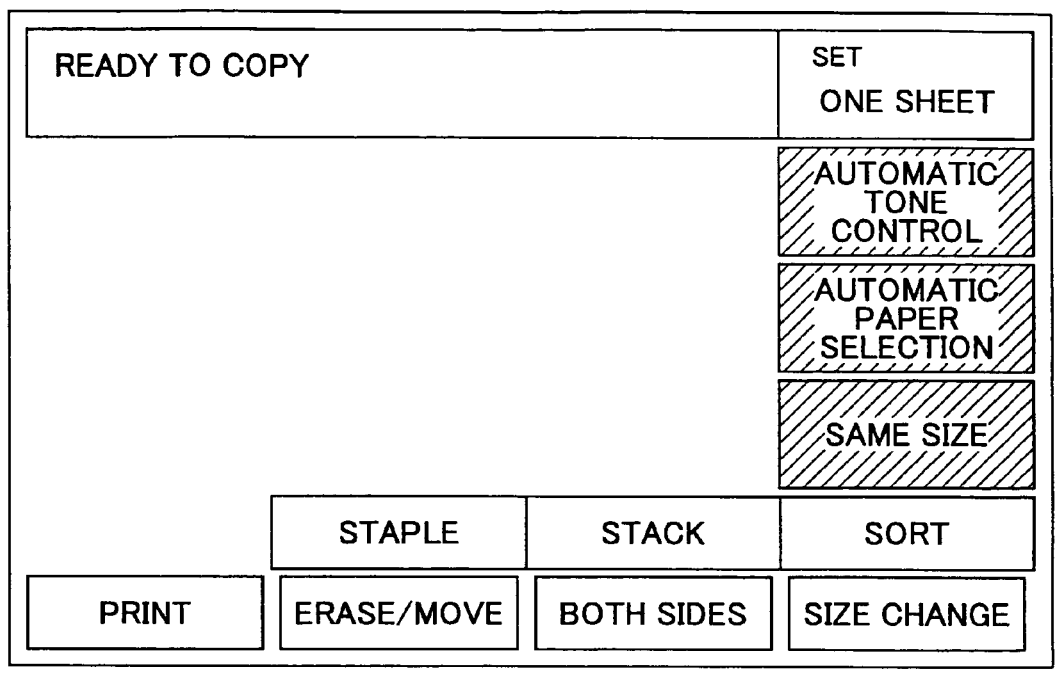
FIG. 3 shows a liquid crystal touch panel of the operation part.

FIG. 3 shows one example of a display on the liquid crystal panel 31 of the operation panel 30.

When an operator touches a key displayed on the liquid crystal panel 31, the key indicating a function thus selected is inverted into black. When details of the function should be input (for example, a size change ratio should be input when a size change function is applied), a page for setting the details is displayed when the key is touched. Thus, since the liquid crystal panel 31 thus employs a display device, an optimum display can be appropriately provided graphically.

As shown in FIG. 3, the liquid crystal panel 31 has a message area on the top left in which a message such as 'ready to copy', 'please wait', or such is displayed; and a copy number display part, to the right, displaying the number of copies set by the operator. To the bottom, an automatic tone adjustment key for initiating a mode of automatically adjusting an image tone; an automatic paper selecting key for initiating a mode of selecting transfer paper automatically; a sort key for initiating processing to arrange each produced copy in a page order; a stack key for initiating processing to distribute the copies for each page, a staple key for initiating processing to bind sorted copies for each copy; a same size key for setting a size change ratio to the 'same size'; a size change key for setting a magnification/size-reduction ratio; a both side key for setting a both side mode; an erase/move key for setting binding margin creating mode or such; and a print key for setting printing of a stamp, date, page or such.

Next, with reference to FIG. 1, the configuration and operation from image reading through production of a latent image of the thus-read image on the photosensitive body 15 are described. The latent image is an electric potential distribution produced on the surface of the photosensitive body 15 as a result of an image being transformed into optical information and being applied thereto.

The reading unit 50 includes the contact glass 6 on which an original is placed and an optical scanning system, which includes an exposure lamp 51, a first mirror 52, a lens 53, a CCD image sensor 54 and so forth. The exposure lamp 51 and the first mirror 52 are fixed on a first carriage not shown; and second and third mirrors 55 and 56 are fixed on a second carriage not shown. When an original is read, the first and second carriages are moved mechanically in relative speeds of 1:2, so that a light path length is made unchanged. This optical scanning system is driven by a scanner driving motor not shown. The original image is read by the CCD image sensor 54, is converted into an electric signal, and is processed. As a result of the lens 53 and the CCD image sensor 54 moving in left/right directions in the figure, an image magnification is controlled. That is, the lateral positions of the lens 53 and the CCD image sensor 54 are determined according to a designated size change ratio.

The writing unit 57 includes a laser output unit 58, an imaging lens 59 and a mirror 60. Inside of the laser output unit 58, a laser diode acting as a laser light source and a rotating polygonal mirror (simply referred to as a polygon mirror, hereinafter) are provided. A laser beam emitted by the laser output unit 58 is deflected by the polygon mirror which is rotated at a constant velocity, passes through the imaging lens 59, is reflected by the mirror 60, and is condensed to form an image on the photosensitive body 15. The deflected laser beam scans and exposes the photosensitive body 15 in a direction (main scan direction) perpendicular to a direction in which the photosensitive body 15 rotates, and thus, carries out recording for each line of the image signal output from a selector 64 (FIG. 8) of an image post-processing part. As a result of repetitions of the main scanning at a predetermined period corresponding to the rotation velocity of the photosensitive body 15 and a predetermined recording density, an image (electrostatic latent image) is produced on the surface of the photosensitive body 15. As described above, the laser beam output from the writing unit 57 is applied to the photosensitive body 15. At a position near one end of the photosensitive body 15 at which the laser beam is applied, a beam sensor for generating a main scan synchronization signal is provided. Based on the main scan synchronization signal, a control signal is generated for controlling image recording starting timing, and carrying out control of input/output of an image signal described later.

A configuration of an image processing part (the image reading part and the image writing part) of the image forming apparatus in the present embodiment is described with reference to FIG. 8.

Light emitted from the above-mentioned exposure lamp 51 is applied to a surface of an original, reflected light from the original surface is imaged via the imaging lens 59 and received by the CCD image sensor 54, the CCD image sensor 54 carries out photoelectric conversion on the received light, and an A/D converter 61 then converts the thus-obtained analog signal to a digital signal. This image signal thus obtained in the digital signal is corrected by a shading correction part 62, and then, MTF correction and γ correction are carried out on the image signal by an image processing part 63. A selector 64 switches whether the image signal should be sent to an image size change part 71 or to a memory controller 65. The image signal passing through the size change part 71 undergoes magnification or size reduction processing there according to a predetermined size change ratio. After that, the image signal is sent to a writing unit 57. A configuration is provided such that the image signal can be input/output between the memory controller 65 and the selector 64 bi-directionally. Although FIG. 8 does not clearly show, the image processing part (IPU) has a function to select from inputs/outputs of a plurality of sets of data so as to be able to process, other than image data input from the image reading part 50, image data externally provided (for example, image data output from a PC or such).

Further, a CPU 68 carrying out setting of the image memory controller 65 or such, control of the image reading part 50 and the image writing unit 57, as well as a ROM 69 and a RAM 70 storing necessary programs and data, are also provided. The CPU 68 also has a function of data writing/reading to/from an image memory 66 via the image memory controller 65. Further, a SCSI driver 75 is provided to carry out communication externally.

Figure 10:
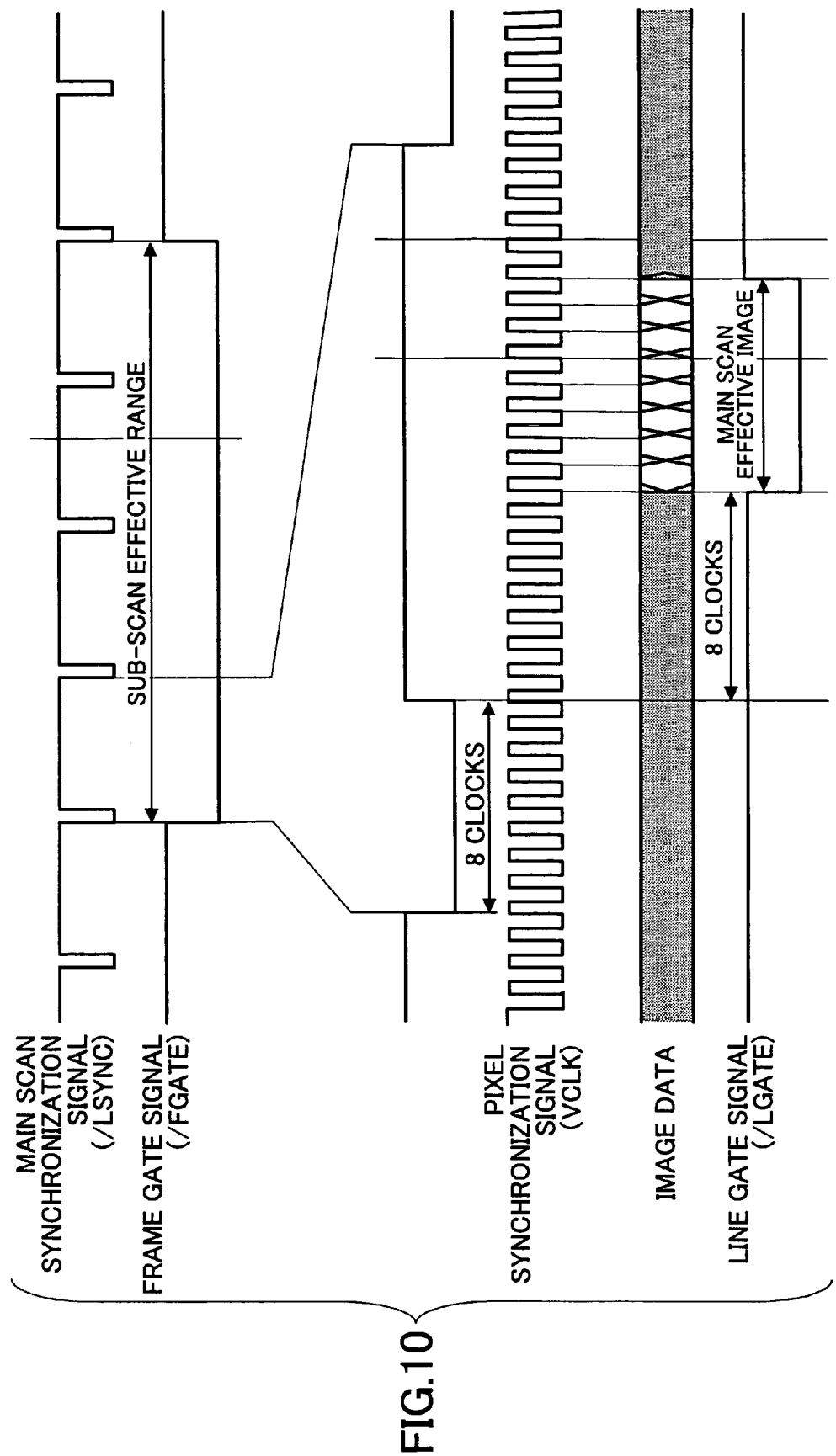
FIG. 10 shows a timing chart of image data synchronization signal and so forth for one page.

Next, with reference to FIG. 10, the image signal for a page in the selector 64 is described.

/FGATE signal indicates a sub-scan directional effective period for a page of image data. /LSYNC signal is a main scan synchronization signal for each line. The image signal becomes effective by a predetermined clock signal after the /LSYNC signal rises up. /LGATE signal indicates that the main scan directional image signal is effective. These signals are in synchronization with a pixel clock signal VCLK. Data of one pixel is sent for one period of VCLK. The image processing part (IPU) has a mechanism for generating, for each of image input and output, /FGATE, /LSYNC, /LGATE and VCLK. Therewith, various combinations of image input/outputs can be achieved.

Figure 8:
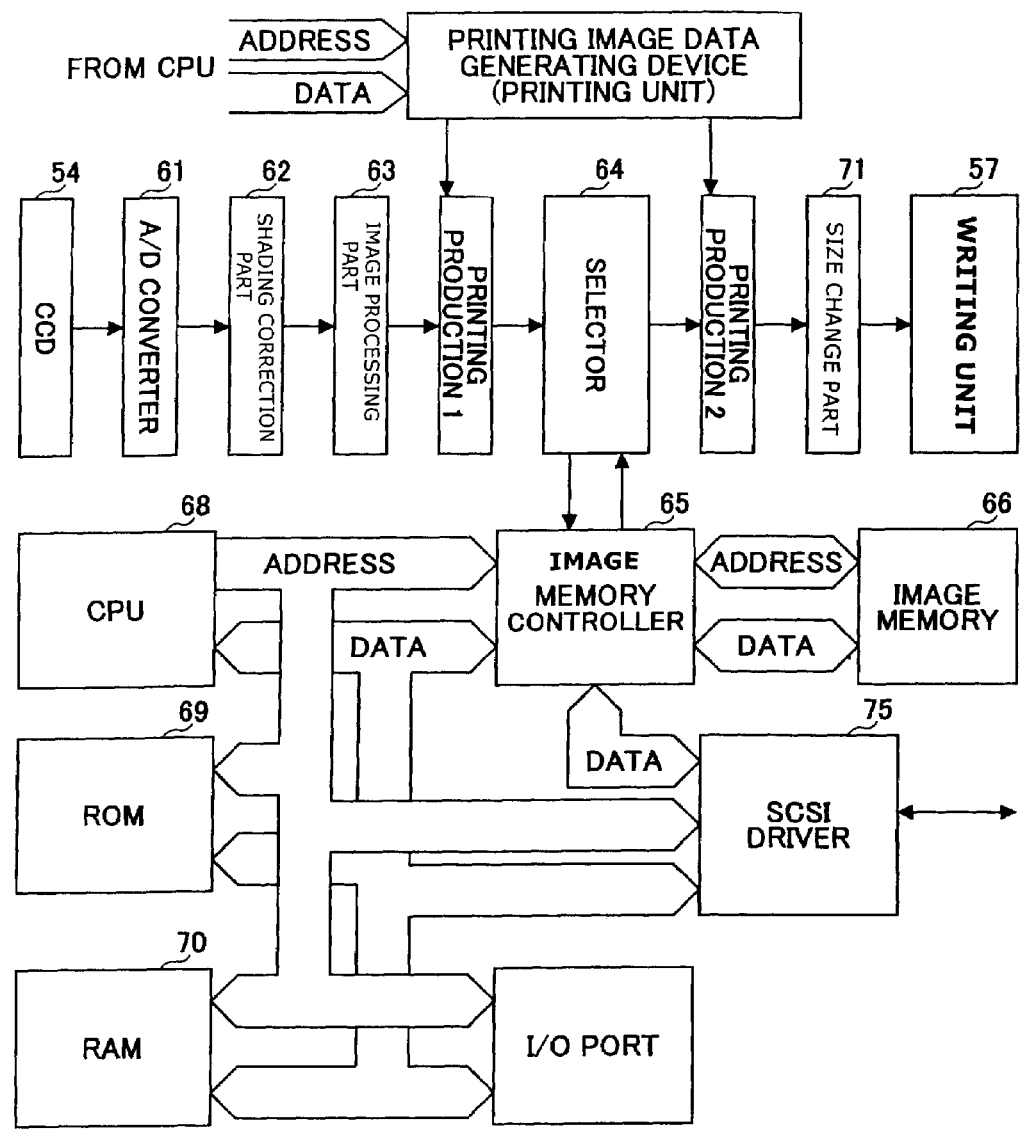
FIG. 8 shows a block diagram of the image forming apparatus in the embodiment of the present invention.
Figure 9:
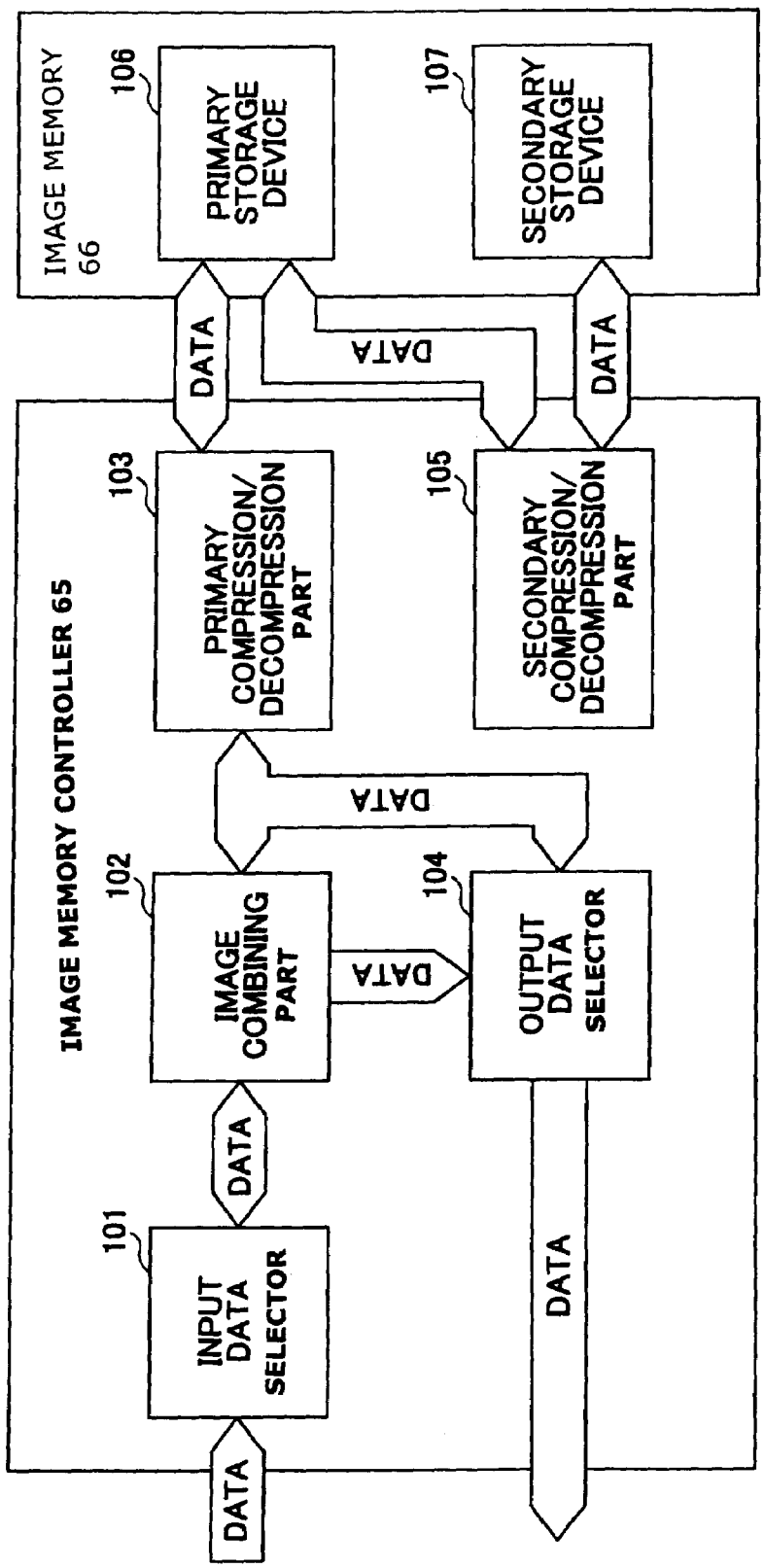
FIG. 9 shows a block diagram of a memory controller and an image memory.

Details of the image memory controller 65 and the image memory 66 of FIG. 8 are described with reference to FIG. 9.

The image memory controller 65 has respective blocks of an input data selector 101, an image combining part 102, a primary compression/decompression part 103, an output data selector 104 and a secondary compression/decompression part 105. Settings of control data for the respective blocks are carried out by the CPU 68. ADDRESS and DATA shown in FIG. 8 represent image data, and data and addresses connected to the CPU 68 are omitted from the figure.

The image memory 66 includes primary and secondary storage devices 106 and 107. The primary storage device 106 employs a memory for which high speed accessing can be made, such as a DRAM, for example, so that data writing to the memory can be carried out approximately in synchronization with input image data transfer rate, or data reading from the memory upon image outputting can be made at high speed. Further, the primary storage device 106 may be configured to have a plurality of divisional areas (in an interface part with the image memory controller 65), depending on a size of image data to handle, so that input and output of the image data can be carried out simultaneously. In order to make possible to carry out input and output of the image data for the plurality of divisional areas in parallel, the primary storage device 106 is connected with the interface of the image memory controller 65 via two sets of read/write address/data wires. Therewith, output (reading) of an image from an area 2 can be carried out while input (writing) of an image to an area 1 can be made possible.

The secondary memory device 107 is a large-capacity memory for storing data for carrying out combining input images, sorting or such. If devices for which high speed accessing can be made are applied for both the primary and secondary storage devices 106 and 107, data processing can be carried out without distinguishing between the primary and secondary storage devices 106 and 107, and control can be carried out relatively easily. However, since such devices as those of DRAMs or such are expensive, a recording medium of a reduced cost with a large capacity even with a not so high accessing rate, is applied as the secondary storage device 107, and input/output data processing is carried out via the primary storage device 106. By employing such a configuration of the image memory 66 as that described above, the image forming apparatus which can carry out input/output, storage, processing of a large size of image data, can be achieved with a relatively simple configuration with a reduced cost.

Outline of operation of the image memory controller 65 is described next.

<1> Image Input (Storage in the Image Memory 66):

The input data selector 101 selects image data to be written in the image memory 66 (primary storage device 106) from among a plurality of sets of image data. The image data selected by the input data selector 101 is provided to the image combining part 102, which combines with data already stored in the image memory 66. The image data thus processed by the image combining part 102 is compressed by the primary compression/decompression part 103, and the thus-compressed data is written in the primary storage device 106. The data written in the primary storage device 106 is then stored in the secondary storage device 107, if necessary, after being further compressed by the secondary compression/decompression part 105.

<2> Image Output (Reading from the Image Memory 66):

Upon outputting an image, the image data is read out from the primary storage device 106. When an image to be output is stored in the primary storage device 106, the primary compression/decompression part 103 decompresses the image data, and the thus-decompressed data, or data further combined with input data is selected by the output data selector 104, and is output. The image combining part 102 carries out combining of data of the primary storage device 106 with input data, and selects a destination to which the thus-combined data is output, or such. By this selection, operation of image outputting, writing back to the primary storage device 106, or simultaneous outputting to both destinations can be carried out. When the image to be output is not stored in the primary storage device 106, the image data to be output is read from the secondary storage device 107, is decompressed by the secondary compression/decompression part 105, the thus-decompressed data is written in the primary storage device 106, and then, the above-described image output operation is carried out thereon.

An operation reservation function of the present embodiment is a function to once complete setting a required mode and setting of an original and to make a reservation since actual copying operation cannot be allowed during heating for the fixing operation, and, therewith, to automatically start the copying operation after the completion of the heating for the fixing operation, and thus, such copy operation is allowed to start. Other than such a time for heating for the fixing operation, as another time for which copy operation or such is allowed only after the completion of the time, an LCT tray lifting time, a polygon motor rotation stabilization time, a toner supply time or such may also be applied for which operation reservation may be made in the present embodiment.

FIGS. 4A and 4B show hardware configuration examples of the image forming apparatus in the present embodiment. As shown, the system includes the above-mentioned image reading part, image writing part, system controller, memory unit, user control device, human detection sensor, remote diagnosis device (CSS), clock and so forth. However, the memory unit is only required when a memory function is required, and is not required when only ordinary copying operation is required. The clock is required only when the above-mentioned weekly timer function is required in which the apparatus is booted or shut down when a specific time has come. The human detection sensor is required only for a case where a function is required in which, as mentioned above, if a user approaches the apparatus in a pre-heating mode, this mode is cancelled automatically. The CSS is required only for a case where remote diagnosis is required, i.e., an apparatus error should be immediately reported to a service center, or execution state/operation state of the apparatus should be monitored remotely. Such devices should be mounted only when the corresponding functions are required. As described later, the CSS is applied to the down frequency detecting and reporting system in the embodiment of the present invention.

A DRAM block of the memory unit shown in FIG. 4A or 4B is used to store the image signal read via the image reading part, and, in response to a request from the system controller, image data stored in the image writing part can be transferred thereto if necessary. A compressing block is provided with a compressing function such as an MH, an MR, an MMR manner or such, compresses a once read image, and thus, contributes to improvement of the operation efficiency of the memory (DRAM). Further, rotation of an image is achieved as a result of reading addresses and a reading sequence from the image writing part being changed. In the configuration example of FIG. 4A, only a single CPU of the system controller carries out control of the image reading part, the image writing part, the memory unit and the CSS. On the other hand, in the configuration example of FIG. 4B, the image reading part, the image writing part and the memory unit have respective CPUs, and, control signal wires are applied to transmit commands from the system controller to the respective CPUs. Thus, a system hardware configuration may be changed freely in various manners.

Figure 5:
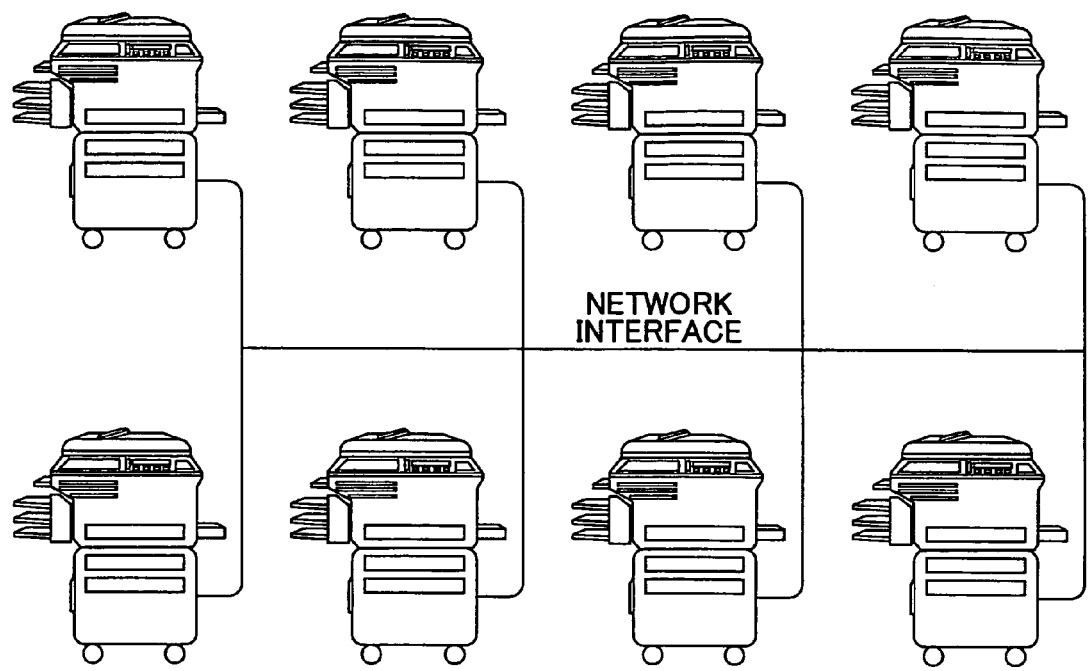
FIG. 5 shows a block diagram of a network copy system.

FIG. 5 shows an example of a network copier system in which the present embodiment of the present invention may be applied. The number of copiers connected to a network is not limited to eight as shown.

Figure 6:
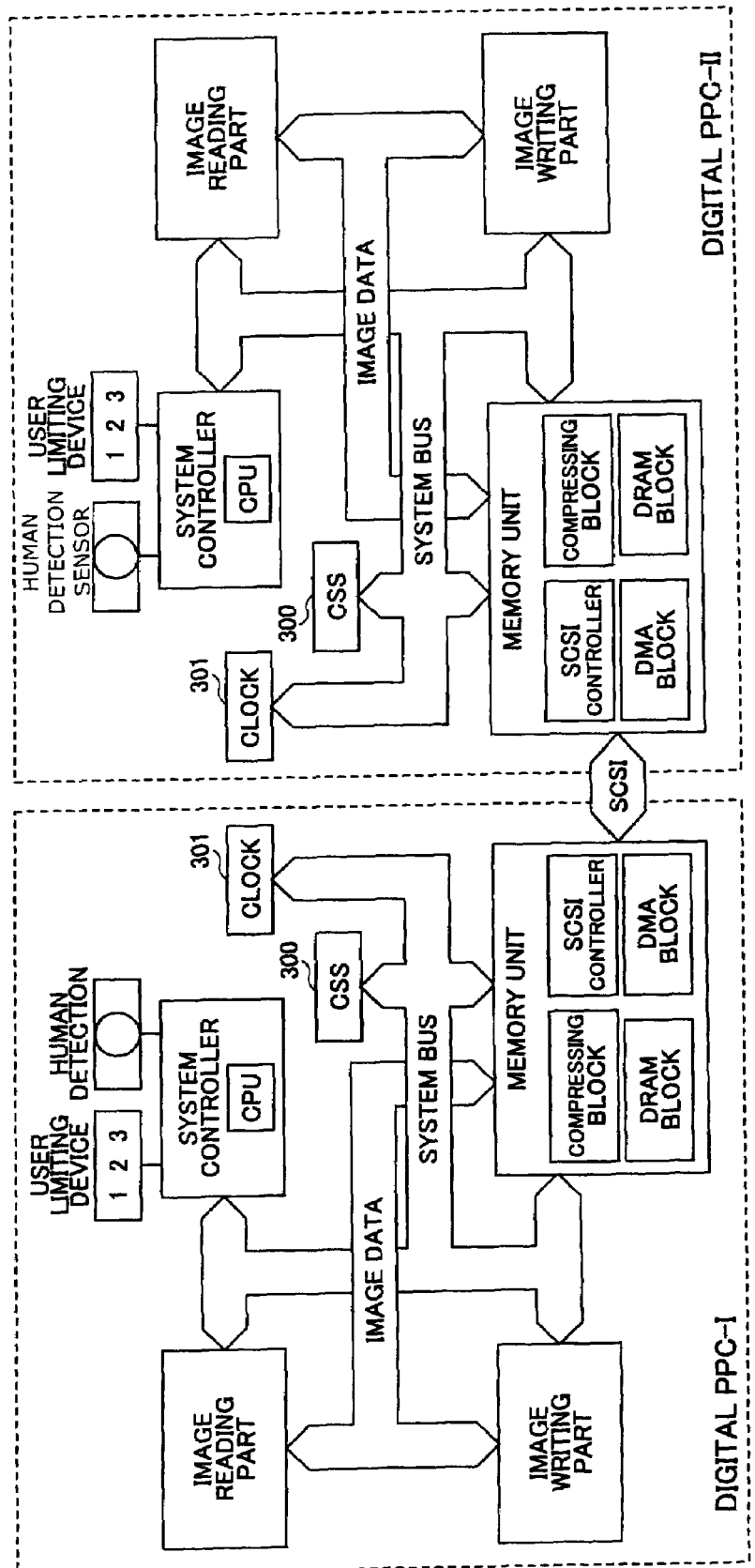
FIG. 6 shows a block diagram of digital PPCs.

Next, a hardware configuration example according to the present embodiment is described with the use of a configuration shown in FIG. 6.

As shown in FIG. 6, a hardware configuration of each digital PPC, corresponding to the image forming apparatus in the embodiment of the present invention, is approximately the same as that described above with reference to FIG. 4A. However, an SCSI (small computer system interface) and a SCSI interface, as the network communication part are applied in the memory unit for the purpose of transferring read image data to the external network, or storing image data received from the network in a DRAM block of the memory unit. Other than this, various types of devices may be applied for the network communication part, for example, the Ethernet (registered trademark) may be applied as a physical part, and a TCP/IP communication manner which is an OSI (Open System Interface) reference model for data communication, may be applied for data communication. By applying a configuration such as that shown in FIG. 6, not only image data transfer as described above, notification of intra-machine states of the respective apparatuses connected to the network, transfer of a control command such as a remote output command described later, a setting command, and so forth may be carried out. As mentioned above, the CSS 300 in each digital PPC shown in FIG. 6 is also used as a communication part for externally reporting that the above-mentioned down frequency exceeds a threshold. A clock 301 is used as a timer for measuring a fixed period for counting the down frequency during a predetermined period.

Figure 7:
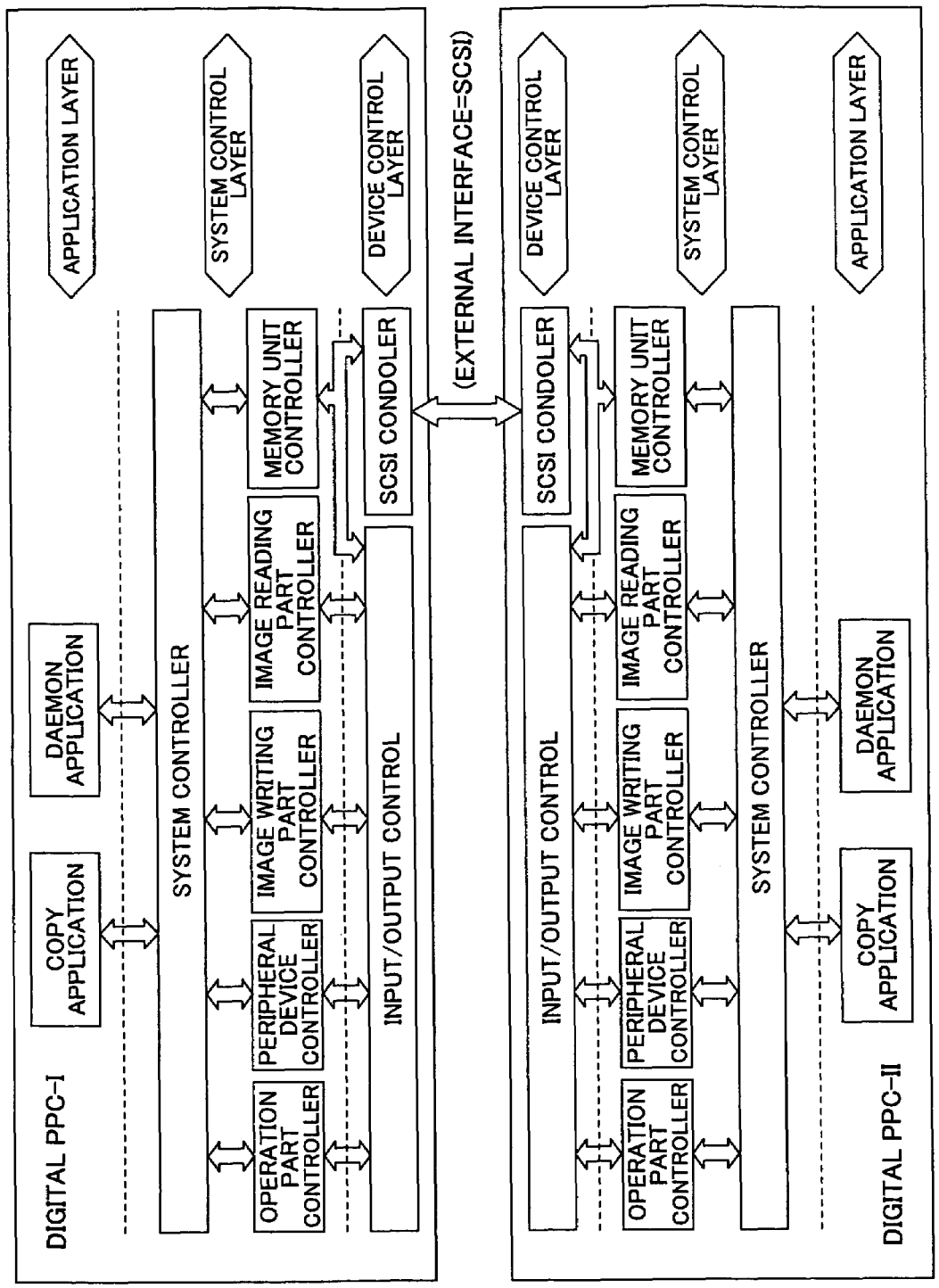
FIG. 7 conceptually shows software of the digital PPC.

Next, operation (referred to as remote output, hereinafter) of transferring image read by the 'digital PPC-I' to the 'digital PPC-II' shown in FIG. 6 is described. FIG. 7 shows a software conceptual diagram of these digital PPC-I and digital PPC-II. 'Copy application' shown is an application for carrying out a copy sequence for carrying out copy operation. 'Input/output control' is a layer (device driver) carrying out logical/physical conversion of given data. 'Operation part controller' is a layer (a layer for carrying out, in a logical level, LCD display, LED turning on/off, key input scanning and so forth) carrying out MMI (main machine interface) for the operation part (operation panel). 'Peripheral device controller' is a layer carrying out, in a logical level, control of peripheral devices such as the automatic both side unit, sorter, ADF and so forth, mounted on the digital PPC. 'Image writing part controller', 'image reading part controller' and 'system unit' are those for controlling the above-mentioned image writing part, image writing part and memory unit. 'Daemon process' is an application for reading image data stored in the memory unit, in response to a printing request made by another machine connected to the network, and transferring the same to the image writing part. Image transfer operation from the other remote second machine connected to the network to the memory unit of the relevant first machine should be completed before the daemon process reads the image from the memory unit and executes printing operation therefor.

The operation part, the image writing part, the image reading part and the memory unit are handled as resources held by the PPC. When the digital PPC-I shown in FIG. 7 carries out copy operation with the use of the respective resources of its own (when the print key 34 of FIG. 2 is pressed), the copy application requests the system control part (system controller) for the respective resources such as the image writing part, the image reading part, or, if necessary, the peripheral device and memory unit. The system control part responds to this request from the copy application, and carries out arbitration for resource usage rights. As a result of the arbitration, the system control part notifies the copy application of the result thereof (whether or not the resources are available). That is, when the digital PPC-I operates in a standing alone manner (that is, it operates without being connected to the network), the copy application can occupy all the resources the system holds. Accordingly, the relevant copy operation can be immediately carried out.

On the other hand, when a printing operation is carried out with the use of resources belonging to another remote second machine (the digital PPC-II in this case, referred to as a remote digital PPC, hereinafter) connected to the common network as shown in FIG. 5 or 6, the relevant first digital PPC-I requests the system control part (system controller) of the remote second digital PPC for usage rights of the resources of the remote second digital PPC.

The system control part (system controller) of the remote second digital PPC (digital PPC-II) carries out arbitration for the resources according to the request, and notifies a result thereof to the application of the request origin first machine (digital PPC-I). The application of the first machine carries out reading of image when the usage rights are thus given, and transfers the image to the memory unit of the remote output destination (remote second digital PPC-II) via the external interface (SCSI in the present embodiment) after completing storage of the image in the memory unit of its own.

After the completion of the image transfer, the relevant first digital PPC-I transmits respective requirements (paper feeding source, paper ejecting destination, printing number of sheets, and so forth) to the daemon process of the remote output destination machine (remote second digital PPC-II) for carrying out the relevant printing operation. After that, the first digital PPC-I transmits a printing start command to the remote second digital PPC-II. Upon receiving the printing start command, the daemon process of the remote second digital PPC requests printing start of the system control part (system controller) of its own, and thus, the relevant remote output is carried out by the system control part of the remote second digital PPC (digital PPC-II). While the memory unit of the second digital PPC-II is thus used by the first digital PPC-I, the memory unit of the second digital PPC-II cannot be further used by the application of the second digital PPC-II itself (or any other digital PPC other than the first digital PPC-I in a case where a plurality of digital PPCs are connected to the common network as shown in FIG. 5).

Next, an embodiment in which, as the down causes, original jam, transfer paper jam, toner end and machine failure are set is described. This embodiment may be carried out by the image forming apparatus or the digital PPC described above in the embodiment of the present invention. There, as mentioned above, the CSS 300 shown in FIG. 6 is applied as the (external) communication part for notifying the management device 200 via the communication control device 202 and the public circuit network 201 of FIG. 11, of a fact that a PPC down frequency exceeds a threshold. The down frequency means the number of times of down events occurring during a predetermined period, which is measured by the clock 301 of FIG. 6.

As shown in FIG. 12, in a non-volatile memory of the apparatus, data of items (1) through (16) is prepared. When down time detection are carried out, a down time detection period of the item (1) is set at any one of items 1, 2 and 3 of a value range column in FIG. 12. Further, down time detection start setting of the item (2) is carried out. The period which can be set is any one of:

1: one day;
2: one week; and
3; one month.

For each thereof, a value range is prepared differently. That is, for the setting in the item (1) is '1', that is, 'one day', a time from which the down time detection is started can be set from among 0 through 23 hours. For the setting in the item (1) is '2', that is, 'one week', a day of week from which the down time detection is started can be set from among 1st through 7th days of week. For the setting in the item (1) is '3', that is, 'one month', a day of month from which the down time detection is started can be set from among 1st through 31st days of month.

Figure 13:
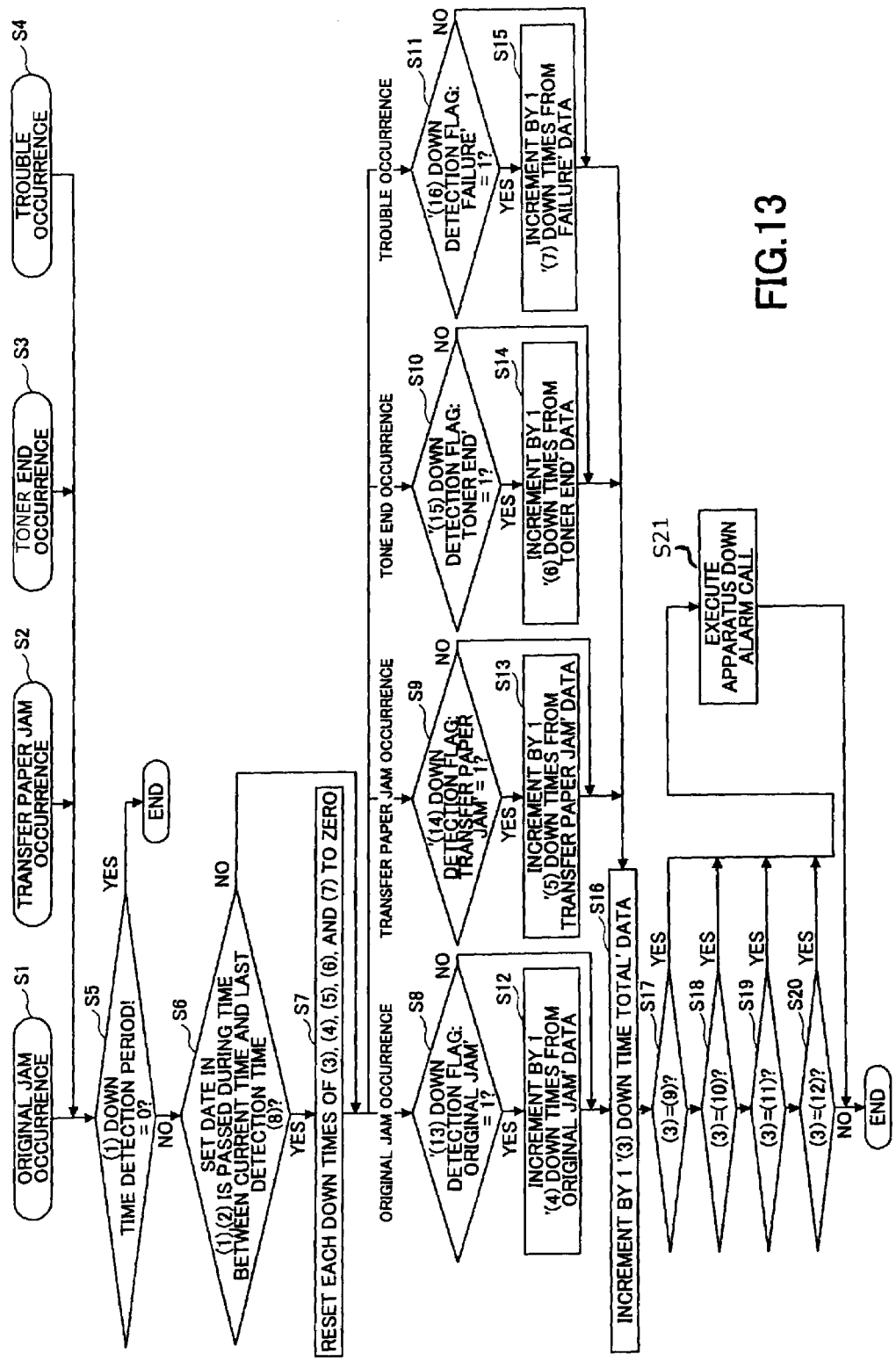
FIG. 13 shows a flow chart of down frequency measurement processing in the embodiment of the present invention.

Next, with reference to a flow chart of FIG. 13, a method of down time detection processing carried out in the digital PPC (image forming apparatus) according to the present embodiment is described.

As shown in FIG. 13, routines to be called when respective down causes, i.e., original jam, transfer paper jam, toner end and machine failure have occurred are prepared (Steps S1 through S4). In each routine, when down detection is not to be carried out, that is, when '0' is set in the item (1) of the data shown in FIG. 12 (Yes in Step S5), the current processing is finished with nothing being carried out. When down time detection is carried out, that is, when '1', '2' or '3' is set in the item (1) of the data shown in FIG. 12 (No in Step S5), it is determined in Step S6 whether or not the down detection start time of the item (2) of FIG. 12 is included in an interval between the down event last detected time of the item (8) of FIG. 12 and the current time. When it is determined that the down detection start time of the item (2) of FIG. 12 is included in the interval between the down event last detected time and the current time (Yes in Step S6), each of down time counters of items (3) through (7) of FIG. 12 are reset to zero (Step S7). After that, subsequent counting processing is carried out. When the determination result of Step S6 is No, down time counting processing is carried out.

The down time counting operation is carried out for each of the down cause routines as described below. Here, a description for the down time counting processing carried out when a down event has occurred for each relevant down cause is made.

For the respective down causes,
(a) original jam down time counting processing (Steps S8 and S12);
(b) transfer paper jam down time counting processing (Steps S9 and S13);
(c) toner end down time counting processing (Steps S10 and S14);
(d) machine failure down time counting processing (Steps S11 and S15); and
(e) total down time counting processing for any one of these down causes (Steps S8-S11 and S16) are carried out.

As to the processing of the above-mentioned (a) through (d), first, a down detection flag (items (13) through (16) of FIG. 12) is checked for each down cause (Steps S8 through S11). However, such counting processing is not carried out for the item of a down cause for which '0' is set in the items (13) through (16) of FIG. 12. For each item of a down cause for which '1' is set in the items (13) through (16), the relevant down count value (the relevant one of the items (4) through (7) of FIG. 12) is incremented by 1 (Steps S12 through S15) each time the relevant down event has occurred. For (e) above, the item (3), 'down time total' data, is incremented by 1 (Step S16) each time any down event from among the above-mentioned four down causes of the items (4) through (7) has occurred. Next, it is determined in Steps S17 through S20 whether or not the 'down time total' data coincides with each of down report thresholds 1 through 4 (the items (9) through (12) of FIG. 12). When a coincidence has occurred in any one of Steps S17 through S20, a down time alarm call is generated (Step S21) so that this matter is reported to the service center.

Thus, according to the present embodiment of the present invention, each time when the number of down times counted during the predetermined period exceeds any one of the plurality of thresholds, this matter is immediately reported to the vendor by means of the external communication unit. Thereby, an appropriate measure can be taken by the vendor's service staff before a penalty arises actually due to an excess of a contract down frequency. Further, the down reporting frequency threshold can be changed for each particular user from the operation panel or via the external communication unit. Thereby, the down frequency reporting function can be operated flexibly according to a particular contract term of each user. Further, by separately preparing cause-by-cause down frequency information from the count data of the respective down time count items (4) through (7) of FIG. 12, a main cause by which a down event occurs frequently can be determined. Further, as each item of the down reporting causes can be set separately as a result of the data shown in FIG. 12 being appropriately rewritten, it is possible to carry out operation in response to various types of contracts between the vendor and users.

The actual processing for executing the down frequency detecting and reporting functions described above with reference to FIGS. 12 and 13 may be carried out by the system controller (system control part) shown in FIGS. 4A, 4B, 6 and 7, with the use of the non-volatile memory accompanying the system controller, in cooperation with the CSS as the communication part as mentioned above.

Further, the present invention is not limited to the above-described embodiments, and variations and modifications may be made without departing from the basic concept of the present invention claimed below.

The present application is based on Japanese Priority Applications Nos. 2004-194579 and 2005-175516, filed on Jun. 30, 2004 and Jun. 15, 2005, respectively, the entire contents of which are hereby incorporated herein by reference.

What is claimed is:

1. An image forming apparatus comprising:
   an image reading part that is configured to read an original image;
   a printing part that is configured to print the read image;
   a detecting part that is configured to detect that a down frequency or a number of times when the image forming apparatus enters a down state exceeds a threshold; and
   a communication part that is configured to report externally when the down frequency exceeds the threshold, the threshold being externally changeable according to a contract of a particular user.

2. The image forming apparatus as claimed in claim 1, wherein:
said threshold is changeable external to the image forming apparatus via at least the communication part or an operation part provided in said image forming apparatus.

3. The image forming apparatus as claimed in claim 1, wherein:
said detecting part is configured to detect the down frequency for each cause of down events; and
said communication part is configured to report for each cause of down events.

4. The image forming apparatus as claimed in claim 3, further comprising:
a cause setting part that is configured to set the cause of down events.

5. The image forming apparatus as claimed in claim 3, wherein:
said threshold is changeable for each of the causes of down events externally via at least the communication part or an operation part provided in said image forming apparatus.

6. The image forming apparatus as claimed in claim 3, wherein:
the cause of down events comprises at least one of original jam, transfer paper jam and supply end.

7. A control method of an image forming apparatus which comprises an image reading part reading an original image; and a printing part printing the read image, the control method comprising:
detecting that a down frequency or a number of times when the image forming apparatus enters a down state exceeds a threshold; and
reporting externally when the down frequency exceeds the threshold, the threshold being externally changeable according to a contract of a particular user.

8. The control method of the image forming apparatus as claimed in claim 7, wherein:
said threshold is changeable external to the image forming apparatus via at least a communication part or an operation part provided in said image forming apparatus.

9. The control method of the image forming apparatus as claimed in claim 7, wherein:
said detecting includes detecting the down frequency for each cause of down events; and
said reporting includes reporting each cause of down events.

10. The control method of the image forming apparatus as claimed in claim 9, further comprising:
setting the cause of down events.

11. The control method of the image forming apparatus as claimed in claim 9, wherein:
said threshold is changeable for each of the causes of the down events externally via at least a communication part or an operation part provided in said image forming apparatus.

12. The control method of the image forming apparatus as claimed in claim 9, wherein:
the cause of down events comprises at least one of original jam, transfer paper jam and supply end.

* * * * *